US012726315B2

(12) United States Patent
Yerramalli et al.

(10) Patent No.: US 12,726,315 B2
(45) Date of Patent: Sep. 1, 2026

(54) CHANNEL BUSY RATIO (CBR) FOR SIDELINK POSITIONING RESOURCE POOLS

(71) Applicant: QUALCOMM Incorporated, San Diego, CA (US)

(72) Inventors: Srinivas Yerramalli, San Diego, CA (US); Piyush Gupta, Bridgewater, NJ (US); Xiaoxia Zhang, San Diego, CA (US); Alexandros Manolakos, Athens (GR); Mukesh Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 18/713,788

(22) PCT Filed: Nov. 30, 2022

(86) PCT No.: PCT/US2022/080653

§ 371 (c)(1),
(2) Date: May 28, 2024

(87) PCT Pub. No.: WO2023/122416

PCT Pub. Date: Jun. 29, 2023

(65) Prior Publication Data

US 2026/0172186 A1 Jun. 18, 2026

(30) Foreign Application Priority Data

Dec. 24, 2021 (GR) ............................ 20210100912

(51) Int. Cl.
*H04L 5/00* (2006.01)

(52) U.S. Cl.
CPC .................................. *H04L 5/0051* (2013.01)

(58) Field of Classification Search
CPC ..................................................... H04L 12/28
(Continued)

(56) References Cited

U.S. PATENT DOCUMENTS

2025/0168812 A1* 5/2025 Gomez Martinez ......................... H04B 1/7163
2026/0081647 A1* 3/2026 Taghizadeh Motlagh .................. H04B 7/0417

FOREIGN PATENT DOCUMENTS

WO 2021221352 A1 11/2021

OTHER PUBLICATIONS

3GPP TS 38.215: "3rd Generation Partnership Project, Technical Specification Group Radio Access Network, NR, Physical layer measurements (Release 16)", 3GPP Standard, Technical Specification, 3rd Generation Partnership Project, Mobile Competence Centre, 650, Route Des Lucioles, F-06921 Sophia-antipolis Cedex, France, vol. RAN WG1, No. V16.1.0, Apr. 3, 2020, pp. 1-22, XP051893824, p. 17.

(Continued)

*Primary Examiner* — Dang T Ton
(74) *Attorney, Agent, or Firm* — Thien T. Nguyen

(57) ABSTRACT

Disclosed are techniques for wireless communication. In an aspect, a user equipment (UE) receives a configuration of one or more resource pools to use for transmission, reception, or both of sidelink positioning reference signals (SL-PRS), and determines a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

30 Claims, 13 Drawing Sheets

(58) Field of Classification Search
USPC ......................... 370/329, 401, 402, 403, 405
See application file for complete search history.

(56) References Cited

OTHER PUBLICATIONS

International Search Report and Written Opinion—PCT/US2022/080653—ISA/EPO—Jun. 9, 2023.
LG Electronics et al., "Discussion on Resource Allocation for SL Positioning Reference Signal", 3GPP TSG RAN WG1 Meeting #112, R1-2301538, Type Discussion, NR_POS_ENH2-CORE, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, 13 Pages, Feb. 17, 2023, XP052248670, p. 8.
Moderator (OPPO): "FL summary for AI 8.11.1.1—Resource Allocation for Power Saving (EOM)", 3GPP TSG RAN WG1 #107-e, R1-2112528, 3rd Generation Partnership Project, Mobile Competence Centre, 650, Route Des Lucioles, F-06921 Sophia-antipolis Cedex, France, vol. RAN WG1, No. e-Meeting, Nov. 11, 2021-Nov. 19, 2021, 85 Pages, Nov. 20, 2021, XP052097843, p. 58-65.
Partial International Search Report—PCT/US2022/080653—ISA/EPO—Apr. 20, 2023.
European Search Report—EP24221275—Search Authority—The Hague—Mar. 31, 2025.

* cited by examiner

CHANNEL BUSY RATIO (CBR) FOR SIDELINK POSITIONING RESOURCE POOLS

CROSS-REFERENCE TO RELATED APPLICATIONS

The present Application for Patent claims the benefit of GR Application No. 20210100912, entitled "CHANNEL BUSY RATIO (CBR) FOR SIDELINK POSITIONING RESOURCE POOLS", filed Dec. 24, 2021, and is a national stage application, filed under 35 U.S.C. § 371, of International Patent Application No. PCT/US2022/080653, entitled, CHANNEL BUSY RATIO (CBR) FOR SIDELINK POSITIONING RESOURCE POOLS", filed Nov. 30, 2022, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving a configuration of one or more resource pools to use for transmission, reception, or both of sidelink positioning reference signals (SL-PRS); and determining a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

In an aspect, a method of wireless communication performed by a user equipment (UE) includes receiving a configuration of one or more resource pools to use for transmission, reception, or both of sidelink positioning reference signals (SL-PRS); and determining a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

In an aspect, a user equipment (UE) includes a memory; at least one transceiver; and at least one processor communicatively coupled to the memory and the at least one transceiver, the at least one processor configured to: receive, via the at least one transceiver, a configuration of one or more resource pools to use for transmission, reception, or both of sidelink positioning reference signals (SL-PRS); and determine a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

In an aspect, a user equipment (UE) includes a memory; at least one transceiver; and at least one processor communicatively coupled to the memory and the at least one transceiver, the at least one processor configured to: receive, via the at least one transceiver, a configuration of one or more resource pools to use for transmission, reception, or both of sidelink positioning reference signals (SL-PRS); and determine a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

In an aspect, a user equipment (UE) includes means for receiving a configuration of one or more resource pools to use for transmission, reception, or both of sidelink positioning reference signals (SL-PRS); and means for determining a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

In an aspect, a user equipment (UE) includes means for receiving a configuration of one or more resource pools to use for transmission, reception, or both of sidelink positioning reference signals (SL-PRS); and means for determining a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

In an aspect, a non-transitory computer-readable medium stores computer-executable instructions that, when executed by a user equipment (UE), cause the UE to: receive a configuration of one or more resource pools to use for transmission, reception, or both of sidelink positioning reference signals (SL-PRS); and determine a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

In an aspect, a non-transitory computer-readable medium stores computer-executable instructions that, when executed by a user equipment (UE), cause the UE to: receive a configuration of one or more resource pools to use for transmission, reception, or both of sidelink positioning reference signals (SL-PRS); and determine a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
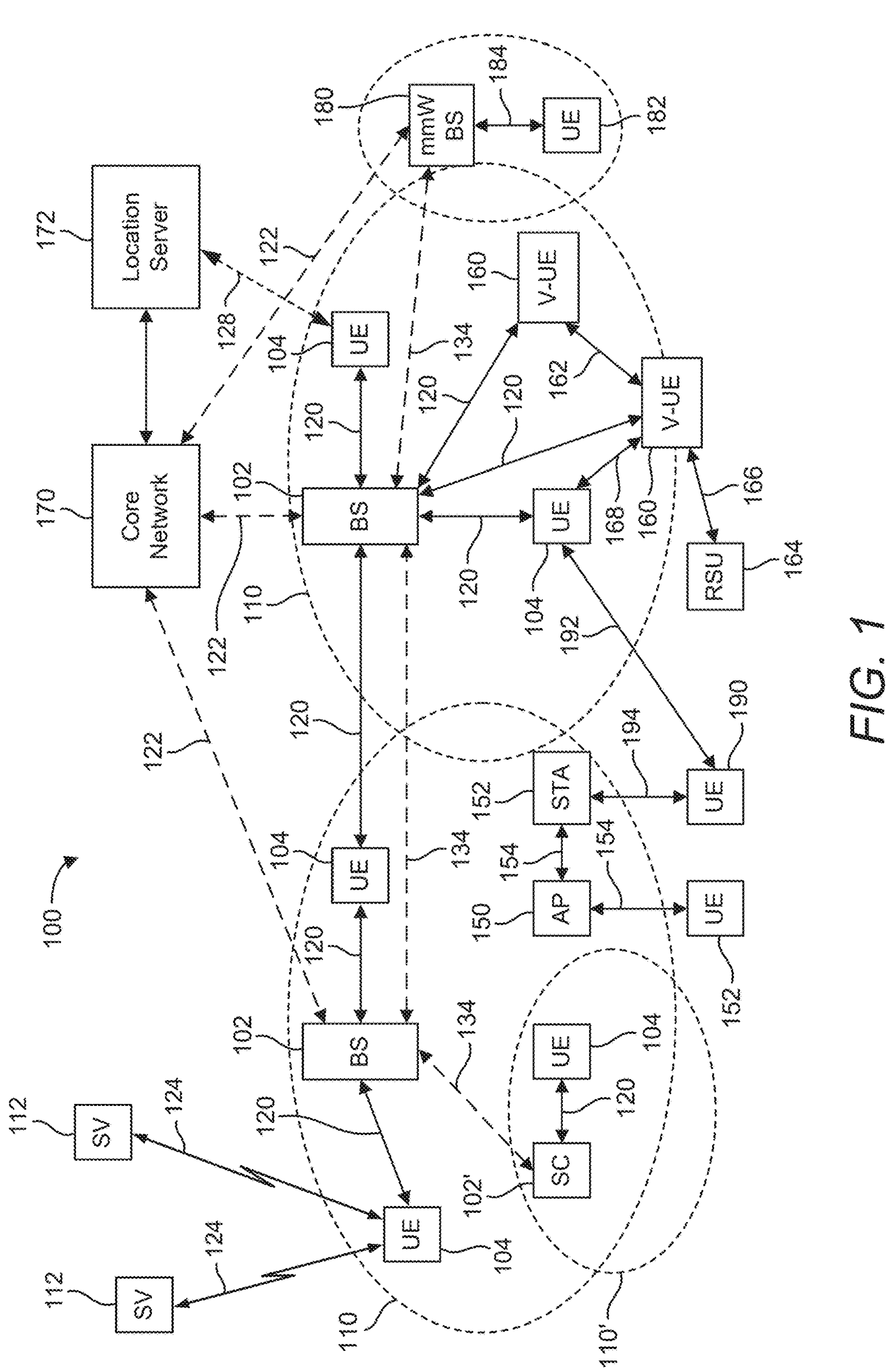
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, “logic configured to” perform the described action.

As used herein, the terms “user equipment” (UE) and “base station” are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term “UE” may be referred to interchangeably as an “access terminal” or “AT,” a “client device,” a “wireless device,” a “subscriber device,” a “subscriber terminal,” a “subscriber station,” a “user terminal” or “UT,” a “mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)), The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

£ In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage arca 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCD), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters, Radio waves in this band may be referred to as a millimeter wave, Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (SV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHZ. Other bands may be allocated in other countries. Thus, as a particular example, the medium of interest utilized by sidelinks 162, 166, 168 may correspond to at least a portion of the licensed ITS frequency band of sub-6 GHZ. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
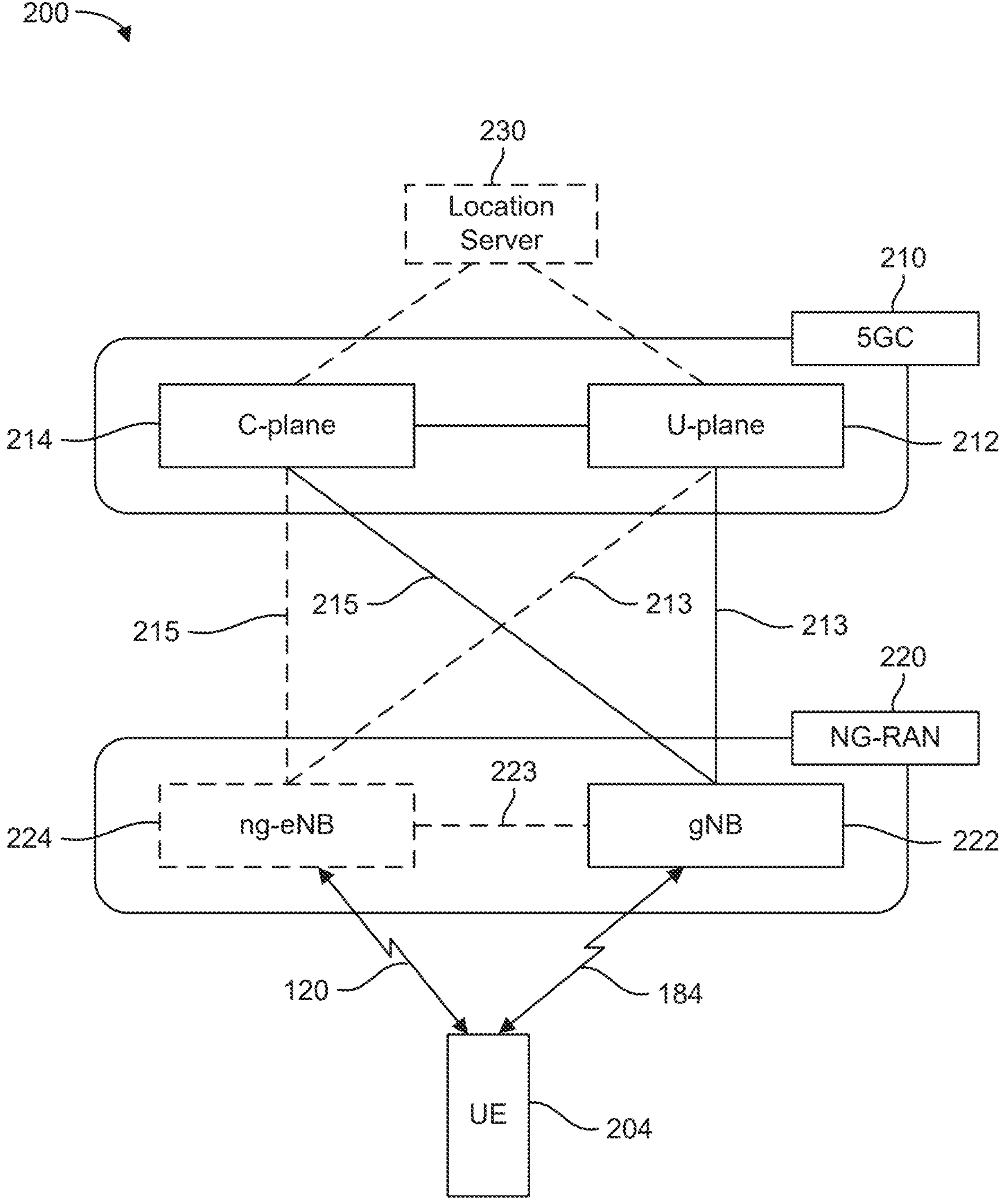
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5 GC 210 and specifically to the user plane functions 212 and control plane functions 214, respectively. In an additional configuration, an ng-eNB 224 may also be connected to the 5 GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5 GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
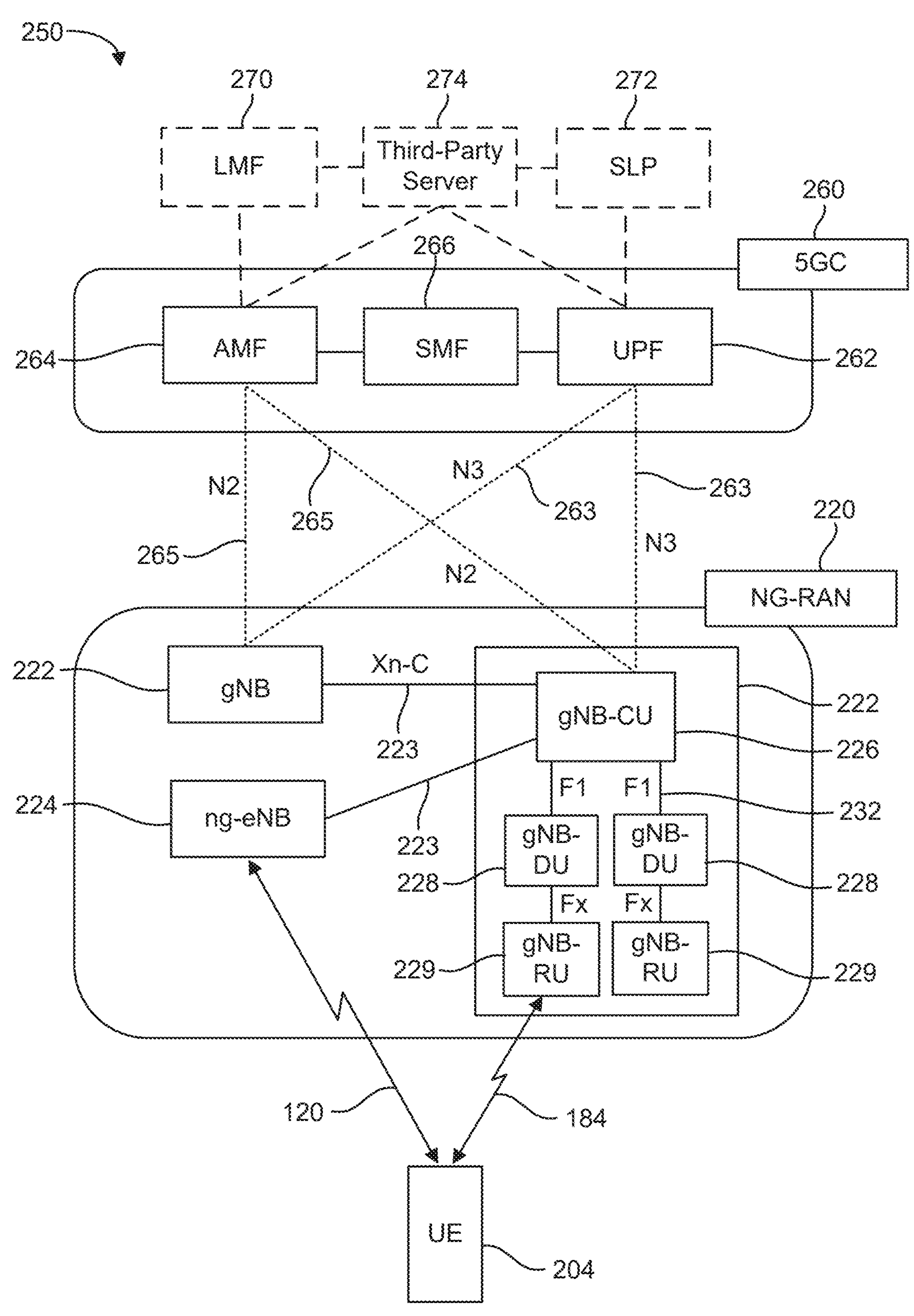

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5 GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220, The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222, Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
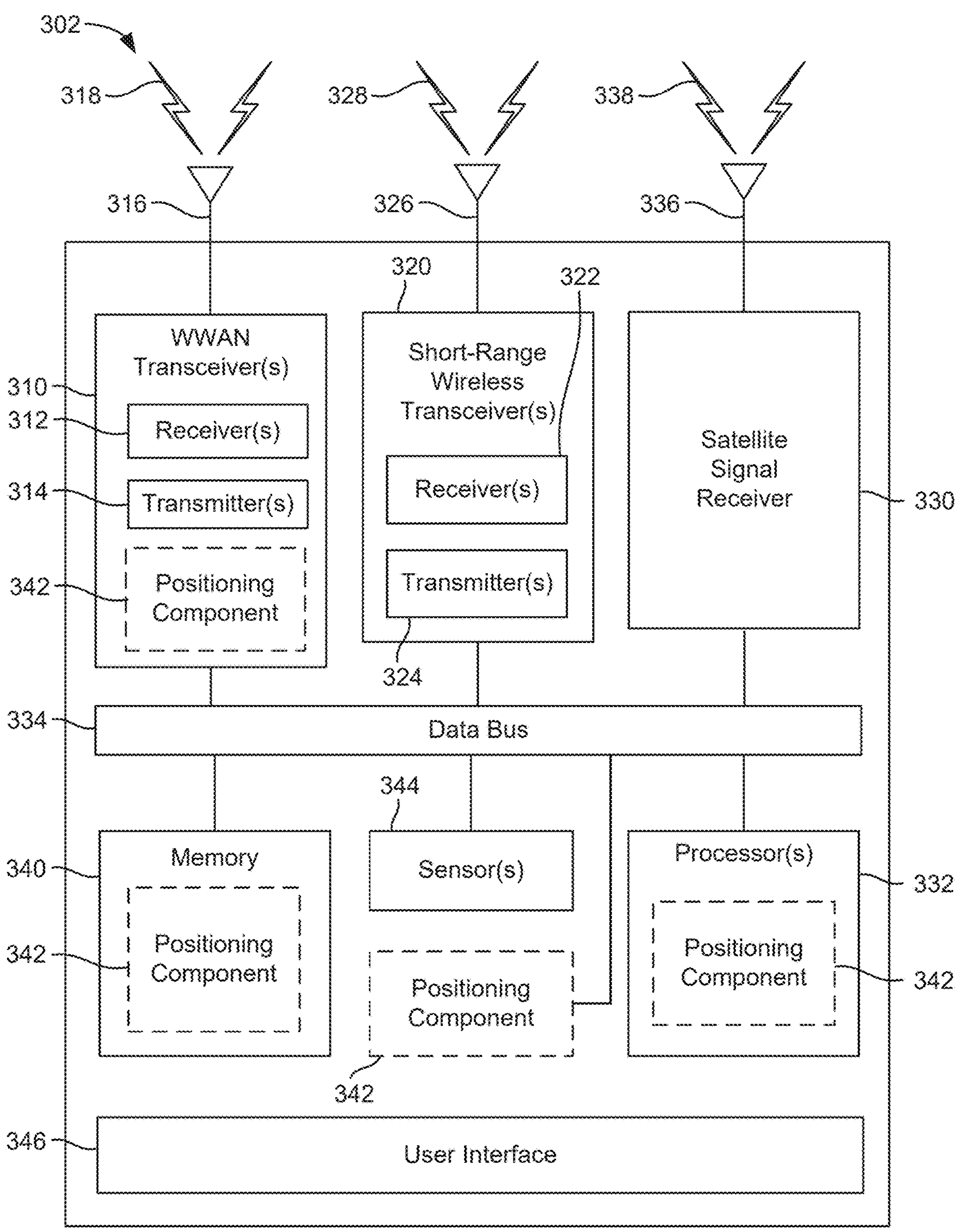
FIGS. 3A, 3B, and 3C are simplified block diagrams of several sample aspects of components that may be employed in a user equipment (UE), a base station, and a network entity, respectively, and configured to support communications as taught herein.
Figure 3B:
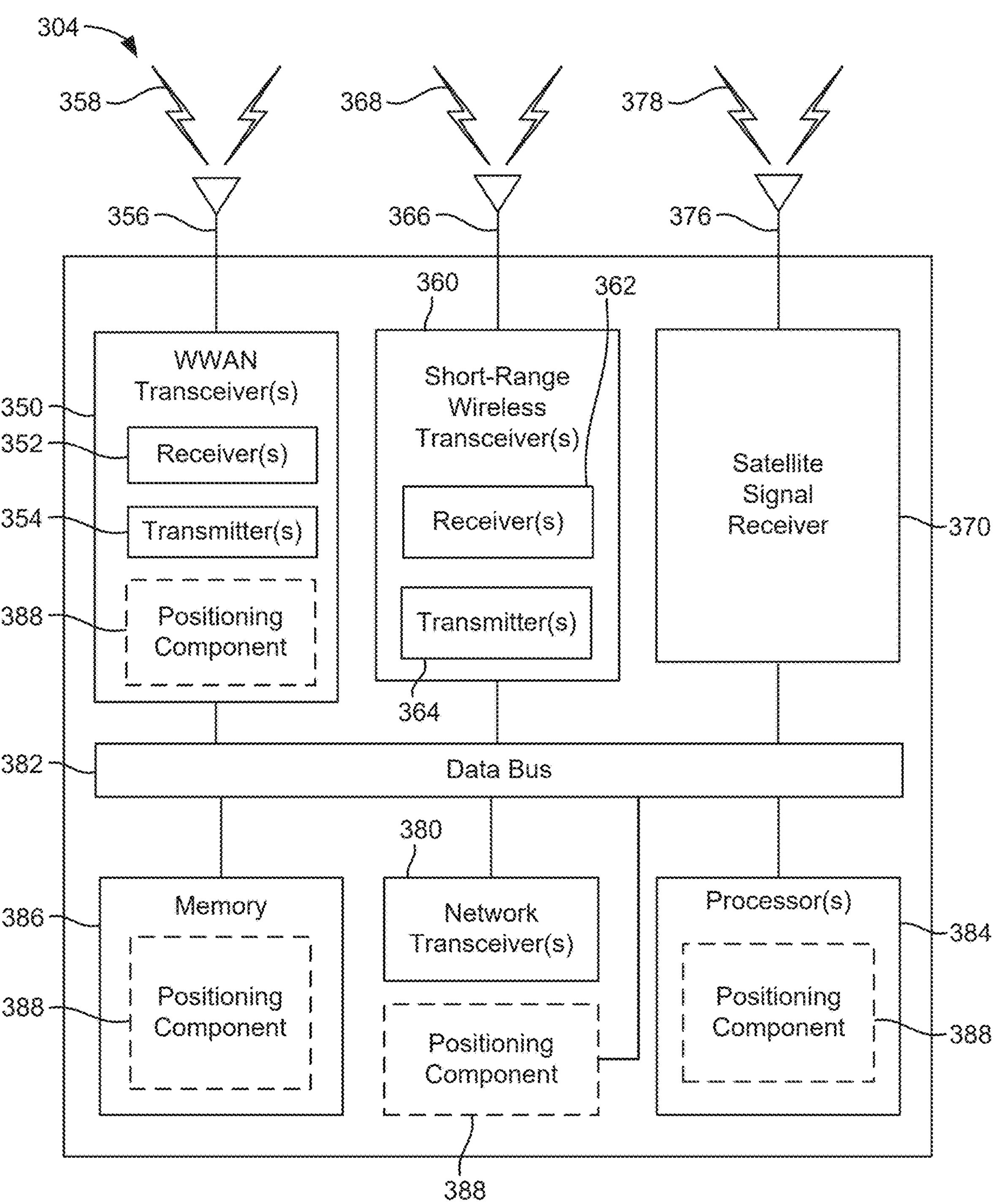
Figure 3C:
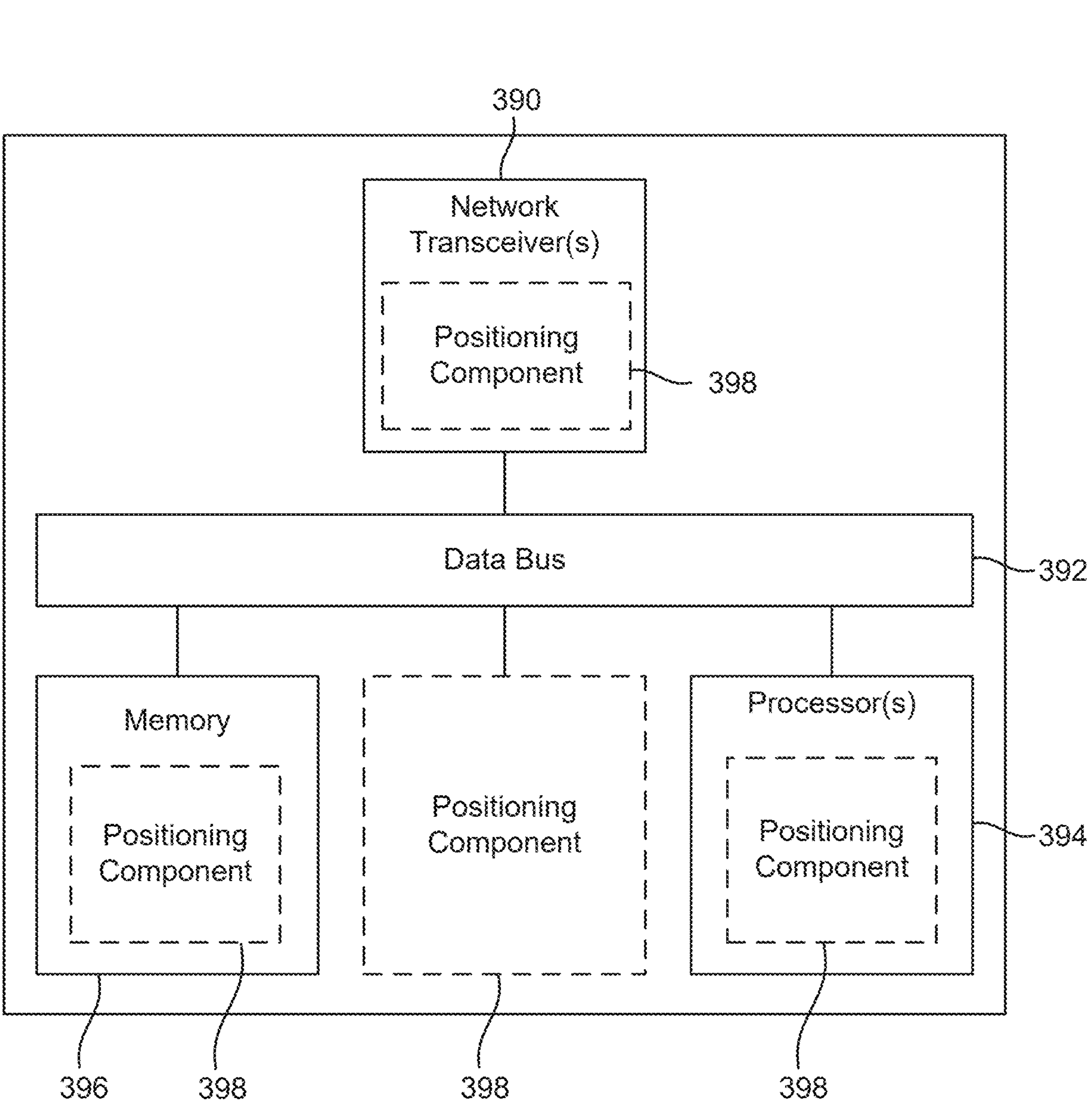

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
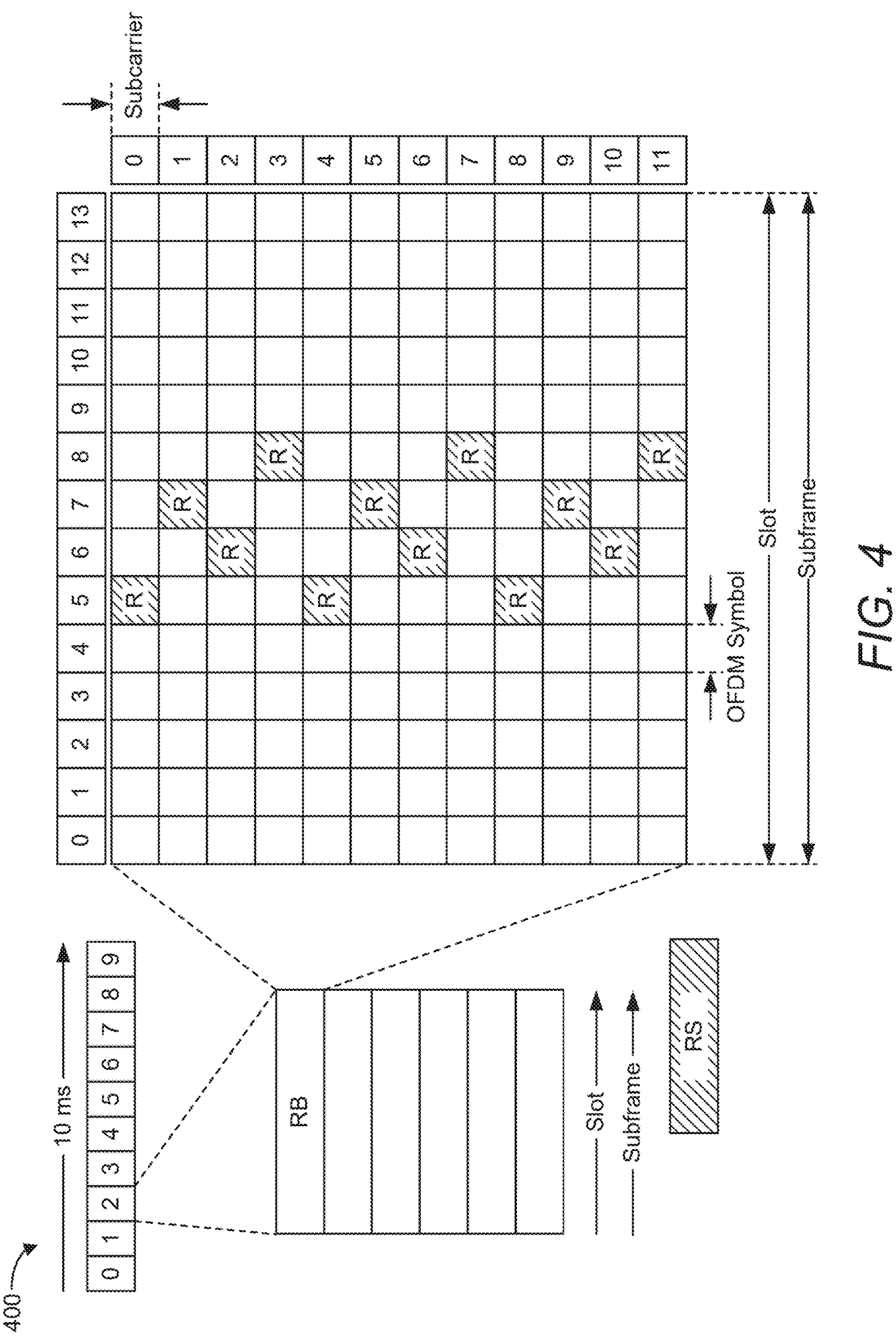
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (∞=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

In an aspect, the reference signal carried on the REs labeled "R" in FIG. 4 may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs, An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 4, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 4); 4-symbol comb-8: {0, 4, 2, 6}; 8-symbol comb-4: {0, 2, 1, 3, 0, 2, 1, 3}; 8-symbol comb-8: {0, 4, 2, 6, 1, 5, 3, 7}; 12-symbol comb-4: {0, 2, 1, 3, 0, 2, 1, 3, 0, 2, 1, 3}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or downlink control information (DCI)).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Figure 5A:
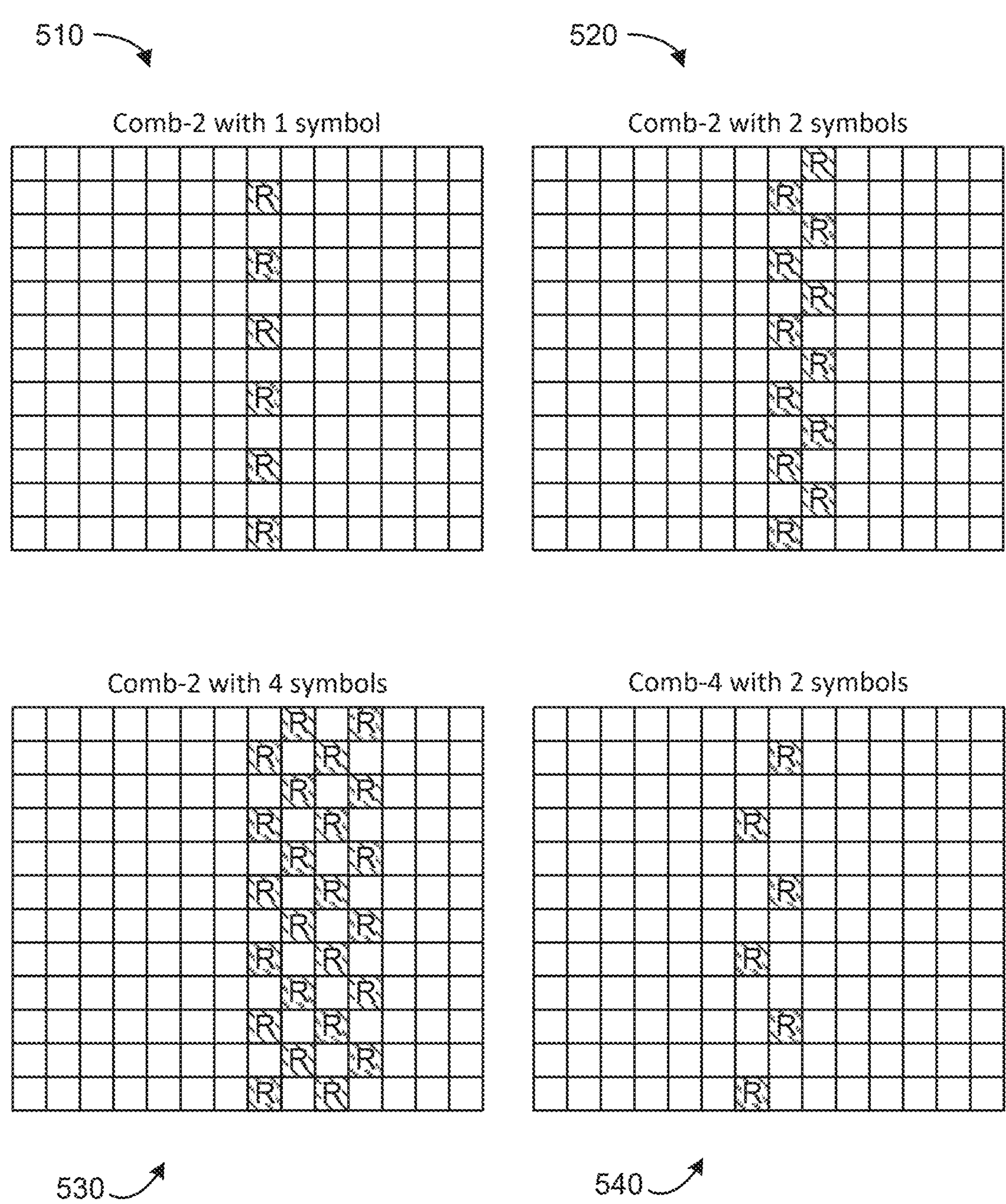
FIGS. 5A and 5B illustrate various comb patterns supported for downlink positioning reference signals (PRS) within a resource block.
Figure 5B:
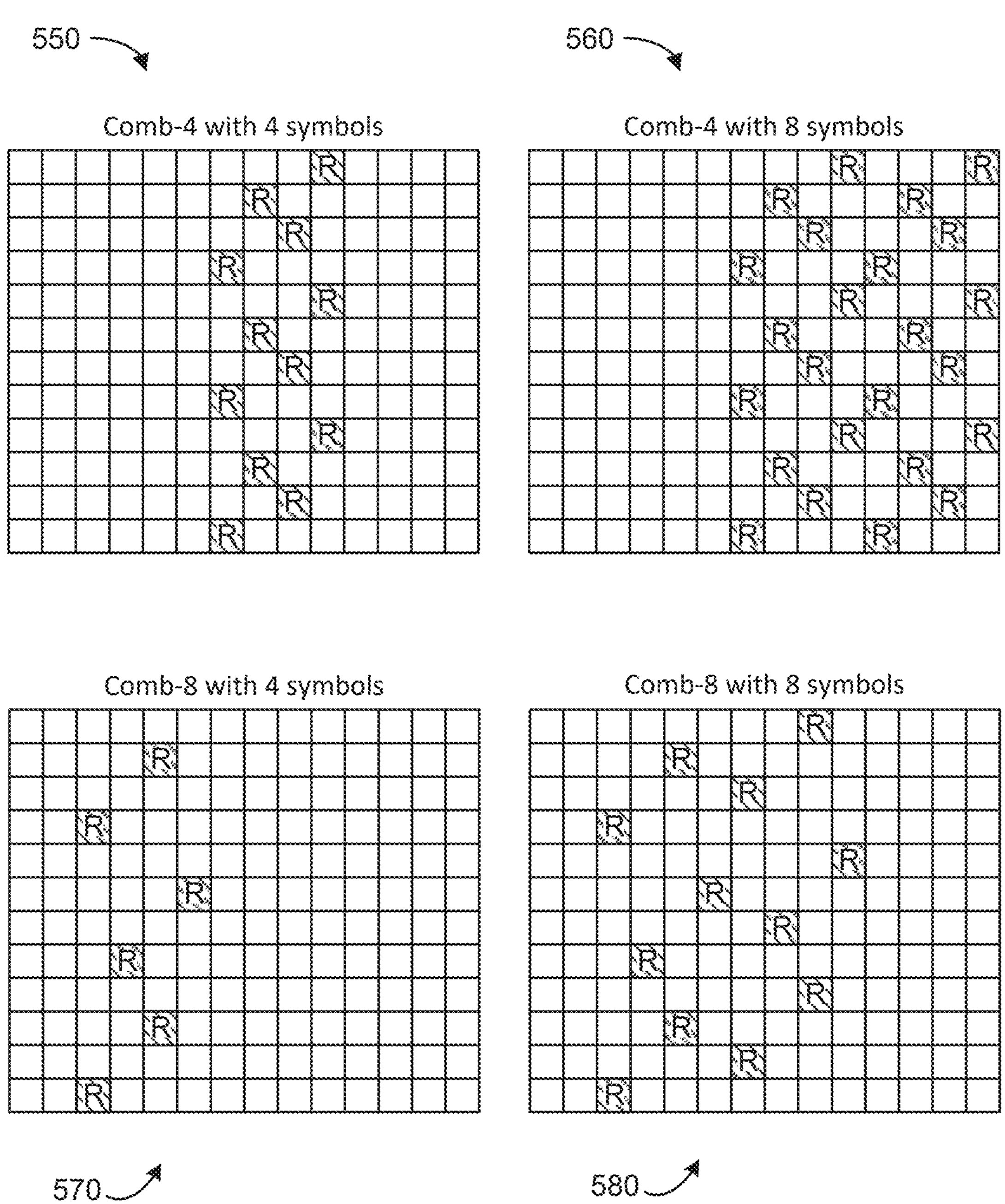

FIGS. 5A and 5B illustrate various comb patterns supported for SRS-for-positioning within a resource block. In FIGS. 5A and 5B, time is represented horizontally and frequency is represented vertically. Each large block in FIGS. 5A and 5B represents a resource block and each small block represents a resource element. As discussed above, a resource element consists of one symbol in the time domain and one subcarrier in the frequency domain. In the example of FIGS. 5A and 5B, each resource block comprises 14 symbols in the time domain and 12 subcarriers in the frequency domain. The shaded resource elements carry, or are scheduled to carry, SRS-for-positioning. As such, the shaded resource elements in each resource block correspond to an SRS resource, or the portion of the SRS resource within one resource block (since an SRS resource can span multiple resource blocks in the frequency domain).

The illustrated comb patterns correspond to various SRS comb patterns described above. Specifically, FIG. 5A illustrates an SRS comb pattern 510 for comb-2 with one symbol, an SRS comb pattern 520 for comb-2 with two symbols, an SRS comb pattern 530 for comb-2 with four symbols, and an SRS comb pattern 540 for comb-4 with two symbols. FIG. 5B illustrates an SRS comb pattern 550 for comb-4 with four symbols, an SRS comb pattern 560 for comb-4 with eight symbols, an SRS comb pattern 570 for comb-8 with four symbols, and an SRS comb pattern 580 for comb-8 with eight symbols.

Note that in the example comb patterns 510, 520, 540, 550, 570, and 580, the resource elements on which the SRS are transmitted are staggered in the frequency domain such that there is at most only one such resource element per subcarrier over the configured number of symbols. For example, for SRS comb pattern 550, there is only one resource element per subcarrier over the four symbols. This is referred to as "frequency domain staggering."

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre)configured to occupy fewer than the 14 symbols of a slot.

Sidelink resources are configured at the radio resource control (RRC) layer. The RRC configuration can be by pre-configuration (e.g., preloaded on the UE) or configuration (e.g., from a serving base station).

Figure 6A:
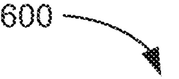
FIGS. 6A and 6B are diagrams of example sidelink slot structures with and without feedback resources, according to aspects of the disclosure.
Figure 6A:
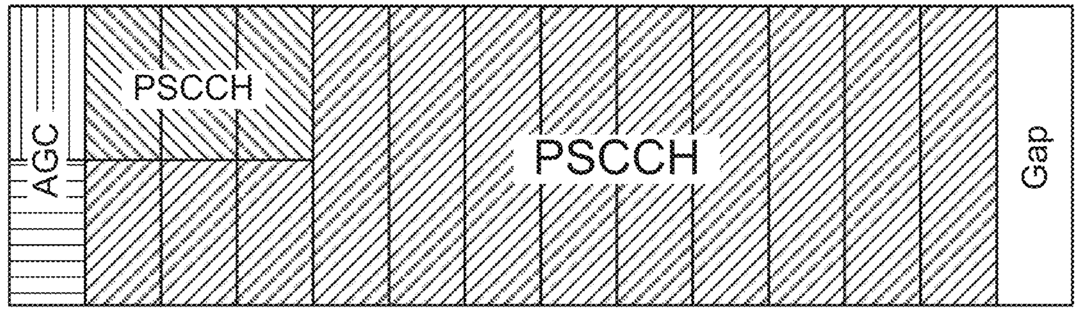

NR sidelinks support hybrid automatic repeat request (HARQ) retransmission. FIG. 6A is a diagram 600 of an example slot structure without feedback resources, according to aspects of the disclosure. In the example of FIG. 6A, time is represented horizontally and frequency is represented vertically. In the time domain, the length of each block is one orthogonal frequency division multiplexing (OFDM) symbol, and the 14 symbols make up a slot. In the frequency domain, the height of each block is one sub-channel. Currently, the (pre)configured sub-channel size can be selected from the set of {10, 15, 20, 25, 50, 75, 100} physical resource blocks (PRBs).

For a sidelink slot, the first symbol is a repetition of the preceding symbol and is used for automatic gain control (AGC) setting. This is illustrated in FIG. 6A by the vertical and horizontal hashing. As shown in FIG. 6A, for sidelink, the physical sidelink control channel (PSCCH) and the physical sidelink shared channel (PSSCH) are transmitted in the same slot. Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user date for the UE. In the example of FIG. 6A, the PSCCH occupies half the bandwidth of the sub-channel and only three symbols. Finally, a gap symbol is present after the PSSCH.

Figure 6B:
Figure 6B:
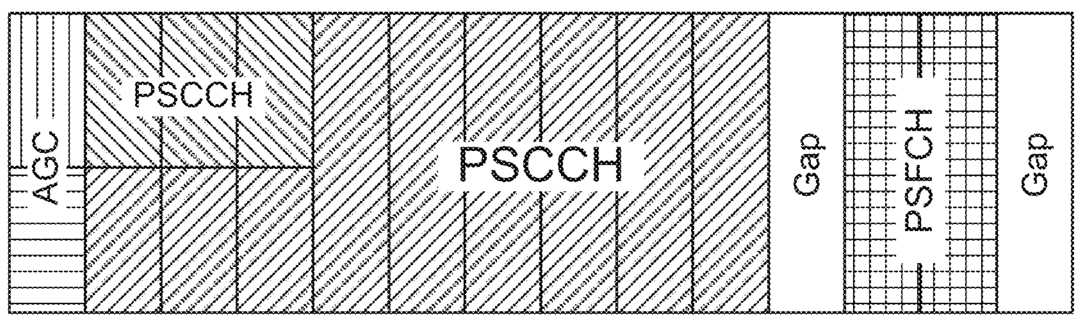

FIG. 6B is a diagram 650 of an example slot structure with feedback resources, according to aspects of the disclosure. In the example of FIG. 6B, time is represented horizontally and frequency is represented vertically. In the time domain, the length of each block is one OFDM symbol, and the 14 symbols make up a slot. In the frequency domain, the height of each block is one sub-channel.

The slot structure illustrated in FIG. 6B is similar to the slot structure illustrated in FIG. 6A, except that the slot structure illustrated in FIG. 6B includes feedback resources.

Specifically, two symbols at the end of the slot have been dedicated to the physical sidelink feedback channel (PSFCH). The first PSFCH symbol is a repetition of the second PSFCH symbol for AGC setting. In addition to the gap symbol after the PSSCH, there is a gap symbol after the two PSFCH symbols. Currently, resources for the PSFCH can be configured with a periodicity selected from the set of {0, 1, 2, 4} slots.

Another aspect of sidelink positioning is the configuration of sidelink resource pools for positioning (RP-Ps). The 12 symbols between the first symbol of a sidelink slot (for AGC) and the last symbol (the gap) in the time domain and the allocated subchannel(s) in the frequency domain form a resource pool for sidelink transmission and/or reception. An RP-P can be configured within a resource pool specifically for positioning purposes. Each RP-P includes an offset, periodicity, number of consecutive symbols within a slot (e.g., as few as one symbol), and/or the bandwidth within a component carrier (or the bandwidth across multiple component carriers). In addition, each RP-P can be associated with a zone or a distance from a reference location.

A base station (or a UE) can assign, to another UE, one or more resource configurations from the RP-Ps. Additionally or alternatively, a UE (e.g., a relay or a remote UE) can request one or more RP-P configurations, and it can include in the request one or more of the following: (1) its location information (or zone identifier), (2) periodicity, (3) bandwidth, (4) offset. (5) number of symbols, and (6) whether a configuration with "low interference" is needed (which can be determined through an assigned quality of service (QoS) or priority).

A base station or a UE can configure/assign rate matching resources or RP-P for rate matching and/or muting to a sidelink UE such that when a collision exists between the assigned resources and another resource pool that contains data (PSSCH) and/or control (PSCCH), the sidelink UE is expected to rate match, mute, and/or puncture the data, DMRS, and/or CSI-RS within the colliding resources. This would enable orthogonalization between positioning and data transmissions for increased coverage of PRS signals.

Figure 7:
FIG. 7 is a diagram illustrating an example resource pool for positioning within a sidelink resource pool, according to aspects of the disclosure.
Figure 7:
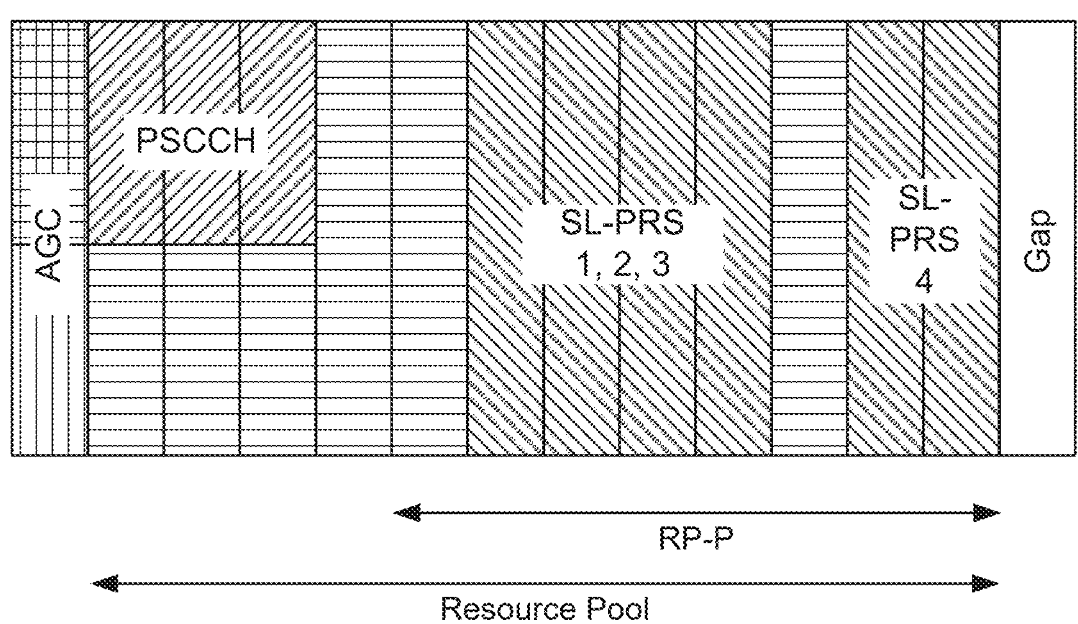

FIG. 7 is a diagram 700 illustrating an example of a resource pool for positioning within a sidelink resource pool, according to aspects of the disclosure. In the example of FIG. 7, time is represented horizontally and frequency is represented vertically. In the time domain, the length of each block is an OFDM symbol, and the 14 symbols make up a slot. In the frequency domain, the height of each block is a sub-channel.

In the example of FIG. 7, the entire slot (except for the first and last symbols) can be a resource pool for sidelink transmission and/or reception. That is, any of the symbols other than the first and last can be allocated for transmission and/or reception. However, an RP-P for sidelink transmission/reception is allocated in the last eight pre-gap symbols of the slot. As such, non-sidelink positioning data, such as user data, CSI-RS, and control information, can only be transmitted in the first four post-AGC symbols and not in the last eight pre-gap symbols to prevent a collision with the configured RP-P. The non-sidelink positioning data that would otherwise be transmitted in the last eight pre-gap symbols can be punctured or muted, or the non-sidelink data that would normally span more than the four post-AGC symbols can be rate matched to fit into the four post-AGC symbols.

Sidelink positioning reference signals (SL-PRS) have been defined to enable sidelink positioning procedures among UEs. Like PRS and SRS, SL-PRS resources are composed of one or more resource elements (i.e., one OFDM symbol in the time domain and one subcarrier in the frequency domain). SL-PRS resources have been designed with a comb-based pattern to enable fast Fourier transform (FFT)-based processing at the receiver, SL-PRS resources are composed of unstaggered, or only partially staggered, resource elements in the frequency domain to provide small time of arrival (TOA) uncertainty and reduced overhead of each SL-PRS resource. In fact, because SL-PRS are transmitted by a UE the same as SRS are, many SRS comb patterns (as illustrated in FIGS. 5A and 5B) are expected to be re-used for SL-PRS. In the example of FIG. 7, as shown, four SL-PRS resources (labeled SL-PRS 1, 2, 3, 4) are transmitted (or scheduled for transmission) in the RP-P. Note that although FIG. 7 illustrates the SL-PRS as contiguous in the frequency domain, they may instead follow a comb pattern within the sub-channel.

SL-PRS may also be associated with specific RP-Ps (e.g., certain SL-PRS may be allocated in certain RP-Ps). SL-PRS have also been defined with intra-slot repetition (not shown in FIG. 7) to allow for combining gains (if needed). There may also be inter-UE coordination of RP-Ps to provide for dynamic SL-PRS and data multiplexing while minimizing SL-PRS collisions.

There are two types of resource allocation for sidelink communication, referred to as "Mode 1" and "Mode 2." For Mode 1 resource allocation, the base station allocates resources for sidelink communication between UEs. For Mode 2 resource allocation, the involved UEs autonomously select sidelink resources, A UE may use two types of measurements to detect and mitigate the effect of congestion when Mode 2 resource allocation is applied: sidelink channel busy ratio (SL CBR) and sidelink channel occupancy ratio (SL CR). More specifically, the SL CBR (or simply CBR) can be used by UEs and other network entities (if reported) to manage the channel load and, if necessary, adapt the resources dedicated to sidelink. The CBR measured in a slot n is defined as the portion of sub-channels in the resource pool whose sidelink received signal strength indication (SL-RSSI) measured by the UE exceeds a (pre-) configured threshold sensed over a CBR measurement window [n−a, n−1], where a is equal to 100 or $100 \cdot 2^{\mu}$ slots, according to the higher layer parameter "sl-Time WindowSizeCBR." As such, CBR measurements reflect the congestion on the medium. CBR measurements are applicable for RRC IDLE intra-frequency, RRC IDLE inter-frequency, RRC CONNECTED intra-frequency, and RRC CONNECTED inter-frequency.

SL-RSSI is defined as the linear average of the total received power (e.g., in Watts) observed in the configured sub-channel in OFDM symbols of a slot configured for PSCCH and PSSCH, starting from the second OFDM symbol. For FR1, the reference point for the SL-RSSI is the antenna connector of the UE. For FR2, the SL-RSSI is measured based on the combined signal from antenna elements corresponding to a given receiver branch. For FR1 and FR2, if receiver diversity is in use by the UE, the reported SL-RSSI value should not be lower than the corresponding SL-RSSI of any of the individual receiver branches.

From the above definitions, it is observed that the SL-RSSI is defined for an OFDM sub-channel for all symbols in a slot, and that it is defined only for PSSCH and PSCCH channels. In addition, it is observed that the CBR is the number of slots in the configured window over which the SL-RSSI exceeds a threshold.

For SL-PRS transmissions, two options are being considered: (1) SL-PRS are time-division multiplexed on an existing or newly configured resource pool, or (2) SL-PRS are allocated in a dedicated time-division multiplexing (TDM) or frequency-division multiplexing (FDM) resource pool exclusively. One consideration for SL-PRS is that many UEs transmit on the same slot using comb-multiplexing, which is a different structure compared to sidelink data channels (as illustrated in FIGS. 5A to 6B).

The present disclosure proposes a modified CBR definition to accommodate SL-PRS. The present disclosure assumes that, as described above with reference to FIG. 7, SL-PRS are carried on dedicated slots and may not necessarily span the entire duration of the slot (whereas in contrast, as shown in FIG. 6A, the PSSCH typically spans all available symbols of a slot). In addition, the present disclosure assumes that different UEs may transmit SL-PRS on different combs (or on the same comb, resulting in collisions) in each slot and for different durations (e.g., some UEs may transmit on six symbols while others may transmit on two symbols). In addition, it is assumed that SL-PRS may occupy a different bandwidth than the SL-PSCCH (if present in the slot).

As a first technique described herein, if a UE is aware of SL-PRS being transmitted in a slot (either by pre-configuration or by an indication from the PSCCH), then the UE is expected to measure SL-RSSI on the following REs: (1) REs used by the one or more PSCCH (if present in the slot) and (2) REs used by the SL-PRS from one or more UEs. The specific PSCCH/SL-PRS REs should be known to the UE via (pre-)configuration. A UE may additionally measure SL-RSSI per the existing definition (to measure any background interference from UEs outside the resource pool).

This technique excludes all the empty REs and is therefore a better representation of the observed SL-RSSI. Using this technique, however, a UE may not be aware of the presence of (some) SL-PRS in a slot (e.g., for UEs for which the UE has not been (pre-)configured, such as UEs in a different sidelink group). In that case, the UE may ignore those resources, leading to an underestimation of the CBR.

As a second technique described herein, a UE may measure SL-PRS on all symbols on which it knows of the existence of SL-PRS (and optionally SL-PSCCH) transmission and ignores the other symbols. Where the UE only measures SL-PRS symbols and ignores SL-PSCCH symbols, it is assumed that SL-PRS and SL-PSSCH from a target UE result in the same average channel power measured. This second technique better captures the unknown SL-PRS, but may include many empty tones (as SL-PRS may not occupy every tone of a symbol, as shown in FIGS. 5A and 5B), which may lead to a different kind of underestimation.

As a third technique described herein, for mmW systems, CBR can be determined on a per-beam basis (resulting in a CBR vector), For example, if a UE uses four receive beams to receive all the SL-PRS, it can compute the CBR separately for each beam by exclusively using the set of symbols (or REs) used by the SL-PRS. Note that this depends on the number of receive beams used by the UE, If the UE changes the number of receive beams or the shape of each beam, it can update the size of the CBR vector.

As an optional aspect, the QCL relationships for each CBR vector can also be included in a report to an upper layer entity receiving this information (e.g., CBR[n] is the CBR on the beam used to receive a certain SSB or CSI-RS from node "id"). The QCL information can be used to determine whether the interference is coming from certain direction(s). Note that the QCL information is dynamic if the UE is moving and may not be particularly useful.

In an aspect, a separate SL-RSSI threshold may be (pre-)configured for SL-PRS and regular sidelink slot CBR determination.

The present disclosure also proposes a definition for the sidelink channel occupancy ratio (SL CR) for SL-PRS resources. The SL CR (or simply CR) evaluated at slot n is defined as the total number of sub-channels used for a UE's transmissions in slots [n−a, n−1] and granted in slots [n, n+b] divided by the total number of configured sub-channels in the transmission pool over [n−a, n+b], The parameter a is a positive integer and b is 0 or a positive integer; a and b are determined by UE implementation, with a+b+1=1000 or $1000 \cdot 2^{\mu}$ slots, according to the higher layer parameter "sl-Time WindowSizeCR." In addition, b<(a+b+1)/2, and n+b should not exceed the last transmission opportunity of the grant for the current transmission. CR measurements are applicable for RRC IDLE intra-frequency, RRC IDLE inter-frequency, RRC CONNECTED intra-frequency, and RRC CONNECTED inter-frequency.

The present disclosure defines the CR for SL-PRS resource at slot n as the total number of $[_{sb}*N_{sym}/N_{total\_sym}*N_{comb}]$ symbols used by the UE for transmissions in the previous a slots and the next b slots configured in the transmission resource pool, where $N_{sb}$ is the number of subbands (or sub-channels) occupied by SL-PRS, $N_{sym}$ is the number of symbols occupied by SL-PRS, $N_{total\_sym}$ is the total number of symbols available in the slot, and $N_{comb}$ is the comb size of the SL-PRS. This definition provides an estimate of the actual resource utilization for the UE by considering the actual number of REs used for SL-PRS transmission.

In an aspect, the CR can also be computed for each transmit beam in systems with beam-based operation, similar to the CBR, except that the CBR is for receive beams.

In an aspect, if there is beam reciprocity (i.e., the same beam is used for transmission and reception), then this information can also be indicated to upper layers. Effectively, this would indicate that on beam i (the same transmit and receive direction), the following CBR and CR values have been observed.

Figure 8:
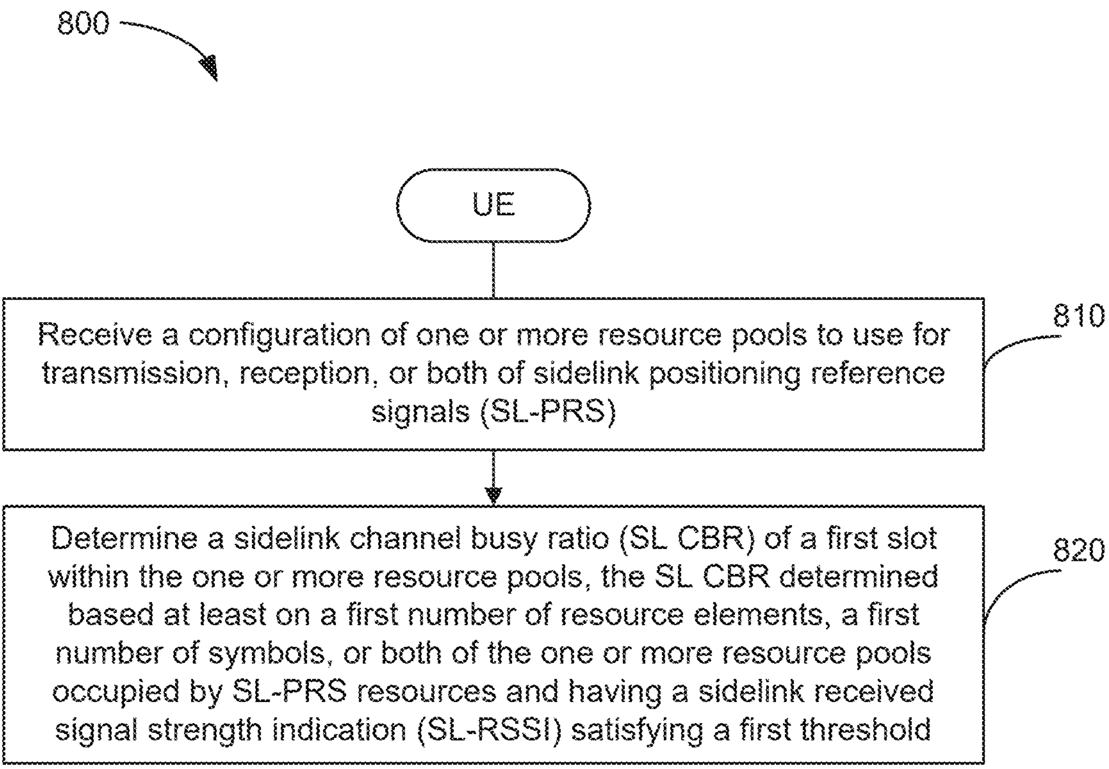
FIGS. 8 and 9 illustrate example methods of wireless communication, according to aspects of the disclosure.

FIG. 8 illustrates an example method 800 of wireless communication, according to aspects of the disclosure. In an aspect, method 800 may be performed by a UE (e.g., any of the UEs described herein).

At 810, the UE receives a configuration of one or more resource pools to use for transmission, reception, or both of SL-PRS. In an aspect, operation 810 may be performed by the one or more WWAN transceivers 310, the one or more processors 332, memory 340, and/or positioning component 342, any or all of which may be considered means for performing this operation.

At 820, the UE determines an SL CBR of a first slot within the one or more resource pools, the SL CBR determined based at least on a first number of resource elements, a first number of symbols, or both of the one or more resource pools occupied by SL-PRS resources and having an SL-RSSI satisfying a first threshold. In an aspect, operation 820 may be performed by the one or more WWAN transceivers 310, the one or more processors 332, memory 340, and/or positioning component 342, any or all of which may be considered means for performing this operation.

Figure 9:
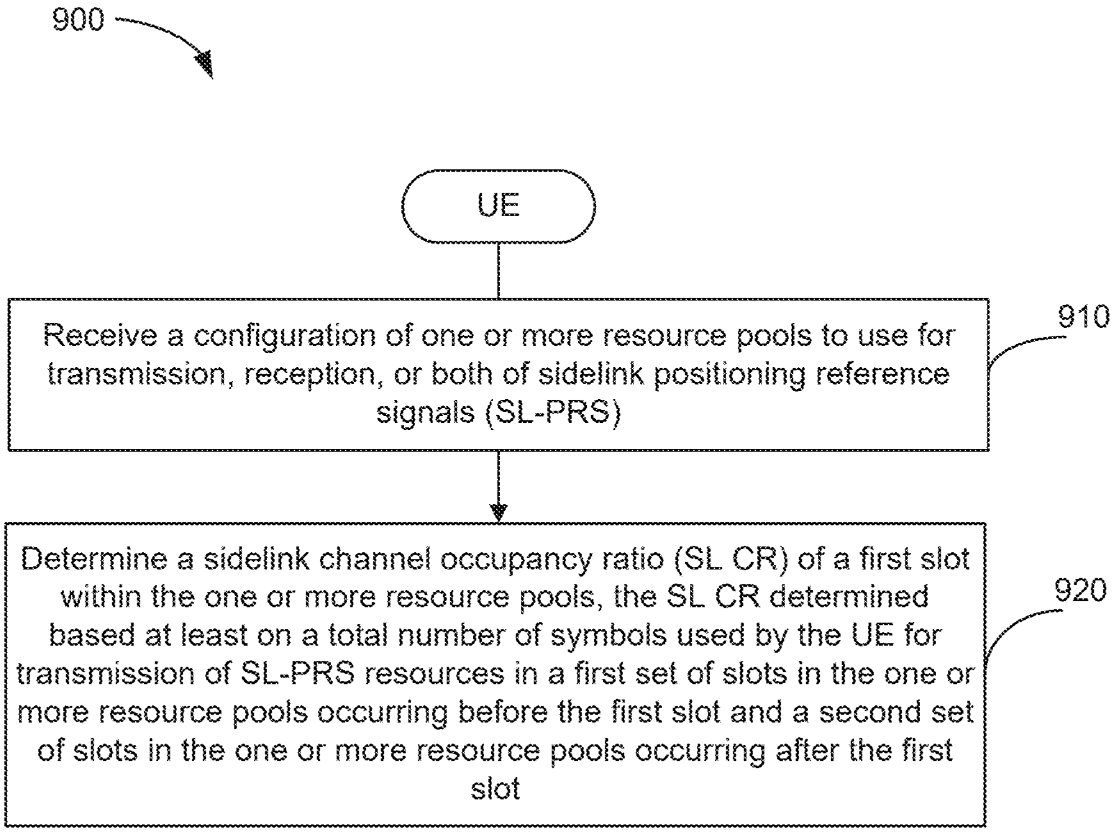

FIG. 9 illustrates an example method 900 of wireless communication, according to aspects of the disclosure. In an aspect, method 900 may be performed by a UE (e.g., any of the UEs described herein).

At 910, the UE receives a configuration of one or more resource pools to use for transmission, reception, or both of SL-PRS. In an aspect, operation 910 may be performed by the one or more WWAN transceivers 310, the one or more processors 332, memory 340, and/or positioning component 342, any or all of which may be considered means for performing this operation.

At 920, the UE determines an SL CR of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot. In an aspect, operation 920 may be performed by the one or more WWAN transceivers 310, the one or more processors 332, memory 340, and/or positioning component 342, any or all of which may be considered means for performing this operation.

As will be appreciated, a technical advantage of the methods 800 and 900 is more accurate determinations of SL CBR and SL CR for situations where the measured resource pools include SL-PRS.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving a configuration of one or more resource pools to use for transmission, reception, or both of sidelink positioning reference signals (SL-PRS); and determining a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

Clause 2. The method of clause 1, wherein: the SL CBR is determined further based on a second number of resource elements, a second number of symbols, or both of the one or more resource pools occupied by a physical sidelink control channel (PSCCH) and having an SL-RSSI satisfying the first threshold.

Clause 3. The method of any of clauses 1 to 2, wherein the first threshold is different than a second threshold used for resource pools that are not configured to the UE for the transmission, reception, or both of SL-PRS.

Clause 4. The method of any of clauses 1 to 2, wherein the first threshold is used for resource pools that are not configured to the UE for the transmission, reception, or both of SL-PRS.

Clause 5. The method of any of clauses 1 to 4, wherein the SL CBR is determined further based on a number of sub-channels of the one or more resource pools having an SL-RSSI satisfying a threshold.

Clause 6. The method of any of clauses 1 to 5, wherein: the SL CBR comprises an SL CBR vector, and the SL CBR vector comprises a CBR value for each receive beam of one or more receive beams of the UE used to receive the SL-PRS resources.

Clause 7. The method of clause 6, wherein: the CBR value for a receive beam of the one or more receive beams is determined based on a number of resource elements, a number of symbols, or both of the one or more resource pools occupied only by SL-PRS resources received on the receive beam.

Clause 8. The method of any of clauses 6 to 7, further comprising: updating a number of values of the SL CBR vector based on a number of the one or more receive beams changing, a beam shape of any of the one or more receive beams changing, or both.

Clause 9. The method of any of clauses 6 to 8, further comprising: reporting, to an upper layer of the UE, a network entity, or both, a quasi-colocation (QCL) relationship for each of the one or more receive beams in the SL CBR vector.

Clause 10. The method of any of clauses 1 to 9, wherein the SL CBR is determined based on the first number of resource elements.

Clause 11. The method of any of clauses 1 to 10, wherein the SL CBR is determined based on the first number of symbols.

Clause 12. The method of any of clauses 1 to 11, wherein the SL-PRS resources are received in the first number of resource elements, the first number of symbols, or both from other UEs configured with the one or more resource pools.

Clause 13. The method of any of clauses 1 to 12, further comprising: transmitting at least one SL-PRS resource in the first slot based on the SL CBR.

Clause 14. The method of any of clauses 1 to 13, further comprising: reporting the SL CBR to an upper layer of the UE, a network entity, or both.

Clause 15. A method of wireless communication performed by a user equipment (UE), comprising: receiving a configuration of one or more resource pools to use for transmission, reception, or both of sidelink positioning reference signals (SL-PRS); and determining a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

Clause 16. The method of clause 15, wherein the total number of symbols is determined as: N_sb*N_sym/

N_total_sym*N_comb, where N_sym is a number of subbands occupied by the SL-PRS resources transmitted by the UE, N_sym is a number of symbols occupied by the SL-PRS resources, N_total_sym is a total number of symbols available in the first slot, and N_comb is a comb size of the SL-PRS resources.

Clause 17. The method of any of clauses 15 to 16, wherein: the SL CR comprises an SL CR vector, and the SL CR vector comprises a CR value for each transmit beam of one or more transmit beams of the UE used to transmit SL-PRS resources.

Clause 18. The method of clause 17, wherein: the CR value for a transmit beam of the one or more transmit beams is determined based on a number of symbols in the first set of slots and the second set of slots used by the UE for transmission of the SL-PRS resources on the transmit beam.

Clause 19. The method of any of clauses 17 to 18, further comprising: updating a number of values of the SL CR vector based on a number of the one or more transmit beams changing, a beam shape of any of the one or more transmit beams changing, or both.

Clause 20. The method of any of clauses 17 to 19, further comprising: reporting, to an upper layer of the UE, a network entity, or both, a quasi-colocation (QCL) relationship for each of the one or more transmit beams in the SL CR vector.

Clause 21. The method of any of clauses 17 to 20, further comprising: reporting, to an upper layer of the UE, a network entity, or both, beam reciprocity information for each of the one or more transmit beams in the SL CR vector.

Clause 22. The method of any of clauses 15 to 21, further comprising: reporting the SL CR to an upper layer of the UE, a network entity, or both.

Clause 23. A user equipment (UE), comprising: a memory; at least one transceiver; and at least one processor communicatively coupled to the memory and the at least one transceiver, the at least one processor configured to: receive, via the at least one transceiver, a configuration of one or more resource pools to use for transmission, reception, or both of sidelink positioning reference signals (SL-PRS); and determine a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

Clause 24. The UE of clause 23, wherein: the SL CBR is determined further based on a second number of resource elements, a second number of symbols, or both of the one or more resource pools occupied by a physical sidelink control channel (PSCCH) and having an SL-RSSI satisfying the first threshold.

Clause 25. The UE of any of clauses 23 to 24, wherein the first threshold is different than a second threshold used for resource pools that are not configured to the UE for the transmission, reception, or both of SL-PRS.

Clause 26. The UE of any of clauses 23 to 24, wherein the first threshold is used for resource pools that are not configured to the UE for the transmission, reception, or both of SL-PRS.

Clause 27. The UE of any of clauses 23 to 26, wherein the SL CBR is determined further based on a number of sub-channels of the one or more resource pools having an SL-RSSI satisfying a threshold.

Clause 28. The UE of any of clauses 23 to 27, wherein: the SL CBR comprises an SL CBR vector, and the SL CBR vector comprises a CBR value for each receive beam of one or more receive beams of the UE used to receive the SL-PRS resources.

Clause 29. The UE of clause 28, wherein: the CBR value for a receive beam of the one or more receive beams is determined based on a number of resource elements, a number of symbols, or both of the one or more resource pools occupied only by SL-PRS resources received on the receive beam.

Clause 30. The UE of any of clauses 28 to 29, wherein the at least one processor is further configured to: update a number of values of the SL CBR vector based on a number of the one or more receive beams changing, a beam shape of any of the one or more receive beams changing, or both.

Clause 31. The UE of any of clauses 28 to 30, wherein the at least one processor is further configured to: report, to an upper layer of the UE, a network entity, or both, a quasi-colocation (QCL) relationship for each of the one or more receive beams in the SL CBR vector.

Clause 32. The UE of any of clauses 23 to 31, wherein the SL CBR is determined based on the first number of resource elements.

Clause 33. The UE of any of clauses 23 to 32, wherein the SL CBR is determined based on the first number of symbols.

Clause 34. The UE of any of clauses 23 to 33, wherein the SL-PRS resources are received in the first number of resource elements, the first number of symbols, or both from other UEs configured with the one or more resource pools.

Clause 35. The UE of any of clauses 23 to 34, wherein the at least one processor is further configured to: transmit, via the at least one transceiver, at least one SL-PRS resource in the first slot based on the SL CBR.

Clause 36. The UE of any of clauses 23 to 35, wherein the at least one processor is further configured to: report, via the at least one transceiver, the SL CBR to an upper layer of the UE, a network entity, or both.

Clause 37. A user equipment (UE), comprising: a memory; at least one transceiver; and at least one processor communicatively coupled to the memory and the at least one transceiver, the at least one processor configured to: receive, via the at least one transceiver, a configuration of one or more resource pools to use for transmission, reception, or both of sidelink positioning reference signals (SL-PRS); and determine a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

Clause 38. The UE of clause 37, wherein the total number of symbols is determined as: N_sb*N_sym/N_total_sym*N_comb, where N_sym is a number of subbands occupied by the SL-PRS resources transmitted by the UE, N_sym is a number of symbols occupied by the SL-PRS resources, N_total_sym is a total number of symbols available in the first slot, and N_comb is a comb size of the SL-PRS resources.

Clause 39. The UE of any of clauses 37 to 38, wherein: the SL CR comprises an SL CR vector, and the SL CR vector comprises a CR value for each transmit beam of one or more transmit beams of the UE used to transmit SL-PRS resources.

Clause 40. The UE of clause 39, wherein: the CR value for a transmit beam of the one or more transmit beams is determined based on a number of symbols in the first set of slots and the second set of slots used by the UE for transmission of the SL-PRS resources on the transmit beam.

Clause 41. The UE of any of clauses 39 to 40, wherein the at least one processor is further configured to: update a number of values of the SL CR vector based on a number of the one or more transmit beams changing, a beam shape of any of the one or more transmit beams changing, or both.

Clause 42. The UE of any of clauses 39 to 41, wherein the at least one processor is further configured to: report, to an upper layer of the UE, a network entity, or both, a quasi-colocation (QCL) relationship for each of the one or more transmit beams in the SL CR vector.

Clause 43. The UE of any of clauses 39 to 42, wherein the at least one processor is further configured to: report, to an upper layer of the UE, a network entity, or both, beam reciprocity information for each of the one or more transmit beams in the SL CR vector.

Clause 44. The UE of any of clauses 37 to 43, wherein the at least one processor is further configured to: report, via the at least one transceiver, the SL CR to an upper layer of the UE, a network entity, or both.

Clause 45. A user equipment (UE), comprising: means for receiving a configuration of one or more resource pools to use for transmission, reception, or both of sidelink positioning reference signals (SL-PRS); and means for determining a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

Clause 46. The UE of clause 45, wherein: the SL CBR is determined further based on a second number of resource elements, a second number of symbols, or both of the one or more resource pools occupied by a physical sidelink control channel (PSCCH) and having an SL-RSSI satisfying the first threshold.

Clause 47. The UE of any of clauses 45 to 46, wherein the first threshold is different than a second threshold used for resource pools that are not configured to the UE for the transmission, reception, or both of SL-PRS.

Clause 48. The UE of any of clauses 45 to 46, wherein the first threshold is used for resource pools that are not configured to the UE for the transmission, reception, or both of SL-PRS.

Clause 49. The UE of any of clauses 45 to 48, wherein the SL CBR is determined further based on a number of sub-channels of the one or more resource pools having an SL-RSSI satisfying a threshold.

Clause 50. The UE of any of clauses 45 to 49, wherein: the SL CBR comprises an SL CBR vector, and the SL CBR vector comprises a CBR value for each receive beam of one or more receive beams of the UE used to receive the SL-PRS resources.

Clause 51. The UE of clause 50, wherein: the CBR value for a receive beam of the one or more receive beams is determined based on a number of resource elements, a number of symbols, or both of the one or more resource pools occupied only by SL-PRS resources received on the receive beam.

Clause 52. The UE of any of clauses 50 to 51, further comprising: means for updating a number of values of the SL CBR vector based on a number of the one or more receive beams changing, a beam shape of any of the one or more receive beams changing, or both.

Clause 53. The UE of any of clauses 50 to 52, further comprising: means for reporting, to an upper layer of the UE, a network entity, or both, a quasi-colocation (QCL) relationship for each of the one or more receive beams in the SL CBR vector.

Clause 54. The UE of any of clauses 45 to 53, wherein the SL CBR is determined based on the first number of resource elements.

Clause 55. The UE of any of clauses 45 to 54, wherein the SL CBR is determined based on the first number of symbols.

Clause 56. The UE of any of clauses 45 to 55, wherein the SL-PRS resources are received in the first number of resource elements, the first number of symbols, or both from other UEs configured with the one or more resource pools.

Clause 57. The UE of any of clauses 45 to 56, further comprising: means for transmitting at least one SL-PRS resource in the first slot based on the SL CBR.

Clause 58. The UE of any of clauses 45 to 57, further comprising: means for reporting the SL CBR to an upper layer of the UE, a network entity, or both.

Clause 59. A user equipment (UE), comprising: means for receiving a configuration of one or more resource pools to use for transmission, reception, or both of sidelink positioning reference signals (SL-PRS); and means for determining a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

Clause 60. The UE of clause 59, wherein the total number of symbols is determined as: N_sb*N_sym/N_total_sym*N_comb, where N_sym is a number of subbands occupied by the SL-PRS resources transmitted by the UE, N_sym is a number of symbols occupied by the SL-PRS resources, N_total_sym is a total number of symbols available in the first slot, and N_comb is a comb size of the SL-PRS resources.

Clause 61. The UE of any of clauses 59 to 60, wherein: the SL CR comprises an SL CR vector, and the SL CR vector comprises a CR value for each transmit beam of one or more transmit beams of the UE used to transmit SL-PRS resources.

Clause 62. The UE of clause 61, wherein: the CR value for a transmit beam of the one or more transmit beams is determined based on a number of symbols in the first set of slots and the second set of slots used by the UE for transmission of the SL-PRS resources on the transmit beam.

Clause 63. The UE of any of clauses 61 to 62, further comprising: means for updating a number of values of the SL CR vector based on a number of the one or more transmit beams changing, a beam shape of any of the one or more transmit beams changing, or both.

Clause 64. The UE of any of clauses 61 to 63, further comprising: means for reporting, to an upper layer of the UE, a network entity, or both, a quasi-colocation (QCL) relationship for each of the one or more transmit beams in the SL CR vector.

Clause 65. The UE of any of clauses 61 to 64, further comprising: means for reporting, to an upper layer of the UE, a network entity, or both, beam reciprocity information for each of the one or more transmit beams in the SL CR vector.

Clause 66. The UE of any of clauses 59 to 65, further comprising: means for reporting the SL CR to an upper layer of the UE, a network entity, or both.

Clause 67. A non-transitory computer-readable medium storing computer-executable instructions that, when executed by a user equipment (UE), cause the UE to: receive a configuration of one or more resource pools to use for transmission, reception, or both of sidelink positioning reference signals (SL-PRS); and determine a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

Clause 68. The non-transitory computer-readable medium of clause 67, wherein: the SL CBR is determined further based on a second number of resource elements, a second number of symbols, or both of the one or more resource pools occupied by a physical sidelink control channel (PSCCH) and having an SL-RSSI satisfying the first threshold.

Clause 69. The non-transitory computer-readable medium of any of clauses 67 to 68, wherein the first threshold is different than a second threshold used for resource pools that are not configured to the UE for the transmission, reception, or both of SL-PRS.

Clause 70. The non-transitory computer-readable medium of any of clauses 67 to 68, wherein the first threshold is used for resource pools that are not configured to the UE for the transmission, reception, or both of SL-PRS.

Clause 71. The non-transitory computer-readable medium of any of clauses 67 to 70, wherein the SL CBR is determined further based on a number of sub-channels of the one or more resource pools having an SL-RSSI satisfying a threshold.

Clause 72. The non-transitory computer-readable medium of any of clauses 67 to 71, wherein: the SL CBR comprises an SL CBR vector, and the SL CBR vector comprises a CBR value for each receive beam of one or more receive beams of the UE used to receive the SL-PRS resources.

Clause 73. The non-transitory computer-readable medium of clause 72, wherein: the CBR value for a receive beam of the one or more receive beams is determined based on a number of resource elements, a number of symbols, or both of the one or more resource pools occupied only by SL-PRS resources received on the receive beam.

Clause 74. The non-transitory computer-readable medium of any of clauses 72 to 73, further comprising computer-executable instructions that, when executed by the UE, cause the UE to: update a number of values of the SL CBR vector based on a number of the one or more receive beams changing, a beam shape of any of the one or more receive beams changing, or both.

Clause 75. The non-transitory computer-readable medium of any of clauses 72 to 74, further comprising computer-executable instructions that, when executed by the UE, cause the UE to: report, to an upper layer of the UE, a network entity, or both, a quasi-colocation (QCL) relationship for each of the one or more receive beams in the SL CBR vector.

Clause 76. The non-transitory computer-readable medium of any of clauses 67 to 75, wherein the SL CBR is determined based on the first number of resource elements.

Clause 77. The non-transitory computer-readable medium of any of clauses 67 to 76, wherein the SL CBR is determined based on the first number of symbols.

Clause 78. The non-transitory computer-readable medium of any of clauses 67 to 77, wherein the SL-PRS resources are received in the first number of resource elements, the first number of symbols, or both from other UEs configured with the one or more resource pools.

Clause 79. The non-transitory computer-readable medium of any of clauses 67 to 78, further comprising computer-executable instructions that, when executed by the UE, cause the UE to: transmit at least one SL-PRS resource in the first slot based on the SL CBR.

Clause 80. The non-transitory computer-readable medium of any of clauses 67 to 79, further comprising computer-executable instructions that, when executed by the UE, cause the UE to: report the SL CBR to an upper layer of the UE, a network entity, or both.

Clause 81. A non-transitory computer-readable medium storing computer-executable instructions that, when executed by a user equipment (UE), cause the UE to: receive a configuration of one or more resource pools to use for transmission, reception, or both of sidelink positioning reference signals (SL-PRS); and determine a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

Clause 82. The non-transitory computer-readable medium of clause 81, wherein the total number of symbols is determined as: N_sb*N_sym/N_total_sym*N_comb, where N_sym is a number of subbands occupied by the SL-PRS resources transmitted by the UE, N_sym is a number of symbols occupied by the SL-PRS resources, N_total_sym is a total number of symbols available in the first slot, and N_comb is a comb size of the SL-PRS resources.

Clause 83. The non-transitory computer-readable medium of any of clauses 81 to 82, wherein: the SL CR comprises an SL CR vector, and the SL CR vector comprises a CR value for each transmit beam of one or more transmit beams of the UE used to transmit SL-PRS resources.

Clause 84. The non-transitory computer-readable medium of clause 83, wherein: the CR value for a transmit beam of the one or more transmit beams is determined based on a number of symbols in the first set of slots and the second set of slots used by the UE for transmission of the SL-PRS resources on the transmit beam.

Clause 85. The non-transitory computer-readable medium of any of clauses 83 to 84, further comprising computer-executable instructions that, when executed by the UE, cause the UE to: update a number of values of the SL CR vector based on a number of the one or more transmit beams changing, a beam shape of any of the one or more transmit beams changing, or both.

Clause 86. The non-transitory computer-readable medium of any of clauses 83 to 85, further comprising computer-executable instructions that, when executed by the UE, cause the UE to: report, to an upper layer of the UE, a network entity, or both, a quasi-colocation (QCL) relationship for each of the one or more transmit beams in the SL CR vector.

Clause 87. The non-transitory computer-readable medium of any of clauses 83 to 86, further comprising computer-executable instructions that, when executed by the UE, cause the UE to: report, to an upper layer of the UE, a network entity, or both, beam reciprocity information for each of the one or more transmit beams in the SL CR vector.

Clause 88. The non-transitory computer-readable medium of any of clauses 81 to 87, further comprising computer-executable instructions that, when executed by the UE, cause the UE to: report the SL CR to an upper layer of the UE, a network entity, or both.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:

receiving a configuration of one or more resource pools to use for transmission, reception, or both of sidelink positioning reference signals (SL-PRS); and determining a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

2. The method of claim 1, wherein:

the SL CBR is determined further based on a second number of resource elements, a second number of symbols, or both of the one or more resource pools occupied by a physical sidelink control channel (PSCCH) and having an SL-RSSI satisfying the first threshold.

3. The method of claim 1, wherein the first threshold is different than a second threshold used for resource pools that are not configured to the UE for the transmission, reception, or both of SL-PRS.

4. The method of claim 1, wherein the first threshold is used for resource pools that are not configured to the UE for the transmission, reception, or both of SL-PRS.

5. The method of claim 1, wherein the SL CBR is determined further based on a number of sub-channels of the one or more resource pools having an SL-RSSI satisfying a threshold.

6. The method of claim 1, wherein:

the SL CBR comprises an SL CBR vector, and the SL CBR vector comprises a CBR value for each receive beam of one or more receive beams of the UE used to receive the SL-PRS resources.

7. The method of claim 6, wherein:

the CBR value for a receive beam of the one or more receive beams is determined based on a number of resource elements, a number of symbols, or both of the one or more resource pools occupied only by SL-PRS resources received on the receive beam.

8. The method of claim 6, further comprising:

updating a number of values of the SL CBR vector based on a number of the one or more receive beams changing, a beam shape of any of the one or more receive beams changing, or both.

9. The method of claim 6, further comprising:

reporting, to an upper layer of the UE, a network entity, or both, a quasi-colocation (QCL) relationship for each of the one or more receive beams in the SL CBR vector.

10. The method of claim 1, wherein the SL CBR is determined based on the first number of resource elements.

11. The method of claim 1, wherein the SL CBR is determined based on the first number of symbols.

12. The method of claim 1, wherein the SL-PRS resources are received in the first number of resource elements, the first number of symbols, or both from other UEs configured with the one or more resource pools.

13. The method of claim 1, further comprising:

transmitting at least one SL-PRS resource in the first slot based on the SL CBR.

14. The method of claim 1, further comprising:

reporting the SL CBR to an upper layer of the UE, a network entity, or both.

15. A method of wireless communication performed by a user equipment (UE), comprising:

receiving a configuration of one or more resource pools to use for transmission, reception, or both of sidelink positioning reference signals (SL-PRS); and determining a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

16. The method of claim 15, wherein the total number of symbols is determined as:

$$N\_sb*N\_\mathrm{sym}/N\_\mathrm{total\_sym}*N\_\mathrm{comb},$$

where N_sym is a number of subbands occupied by the SL-PRS resources transmitted by the UE, N_sym is a number of symbols occupied by the SL-PRS resources, N_total_sym is a total number of symbols available in the first slot, and N_comb is a comb size of the SL-PRS resources.

17. The method of claim 15, wherein:

the SL CR comprises an SL CR vector, and the SL CR vector comprises a CR value for each transmit beam of one or more transmit beams of the UE used to transmit SL-PRS resources.

18. The method of claim 17, wherein:

the CR value for a transmit beam of the one or more transmit beams is determined based on a number of symbols in the first set of slots and the second set of slots used by the UE for transmission of the SL-PRS resources on the transmit beam.

19. The method of claim 17, further comprising:

updating a number of values of the SL CR vector based on a number of the one or more transmit beams changing, a beam shape of any of the one or more transmit beams changing, or both.

20. The method of claim 17, further comprising:

reporting, to an upper layer of the UE, a network entity, or both, a quasi-colocation (QCL) relationship for each of the one or more transmit beams in the SL CR vector.

21. The method of claim 17, further comprising:

reporting, to an upper layer of the UE, a network entity, or both, beam reciprocity information for each of the one or more transmit beams in the SL CR vector.

22. The method of claim 15, further comprising:

reporting the SL CR to an upper layer of the UE, a network entity, or both.

23. A user equipment (UE), comprising:

a memory;

at least one transceiver; and at least one processor communicatively coupled to the memory and the at least one transceiver, the at least one processor configured to:

receive, via the at least one transceiver, a configuration of one or more resource pools to use for transmission, reception, or both of sidelink positioning reference signals (SL-PRS); and determine a sidelink channel busy ratio (SL CBR) of a first slot within the one or more resource pools, the SL CBR determined based at least on a first number of resource elements, a first number of symbols, or both of the one or more resource pools occupied by SL-PRS resources and having a sidelink received signal strength indication (SL-RSSI) satisfying a first threshold.

24. The UE of claim 23, wherein:

the SL CBR is determined further based on a second number of resource elements, a second number of symbols, or both of the one or more resource pools occupied by a physical sidelink control channel (PSCCH) and having an SL-RSSI satisfying the first threshold.

25. The UE of claim 23, wherein the SL CBR is determined further based on a number of sub-channels of the one or more resource pools having an SL-RSSI satisfying a threshold.

26. The UE of claim 23, wherein:

the SL CBR comprises an SL CBR vector, and the SL CBR vector comprises a CBR value for each receive beam of one or more receive beams of the UE used to receive the SL-PRS resources.

27. The UE of claim 23, wherein the SL-PRS resources are received in the first number of resource elements, the first number of symbols, or both from other UEs configured with the one or more resource pools.

28. A user equipment (UE), comprising:

a memory;

at least one transceiver; and at least one processor communicatively coupled to the memory and the at least one transceiver, the at least one processor configured to:

receive, via the at least one transceiver, a configuration of one or more resource pools to use for transmission, reception, or both of sidelink positioning reference signals (SL-PRS); and determine a sidelink channel occupancy ratio (SL CR) of a first slot within the one or more resource pools, the SL CR determined based at least on a total number of symbols used by the UE for transmission of SL-PRS resources in a first set of slots in the one or more resource pools occurring before the first slot and a second set of slots in the one or more resource pools occurring after the first slot.

29. The UE of claim 28, wherein the total number of symbols is determined as:

$$N\_sb*N\_\text{sym}/N\_\text{total\_sym}*N\_\text{comb},$$

where N_sym is a number of subbands occupied by the SL-PRS resources transmitted by the UE, N_sym is a number of symbols occupied by the SL-PRS resources, N_total_sym is a total number of symbols available in the first slot, and N_comb is a comb size of the SL-PRS resources.

30. The UE of claim 28, wherein:

the SL CR comprises an SL CR vector, and the SL CR vector comprises a CR value for each transmit beam of one or more transmit beams of the UE used to transmit SL-PRS resources.

* * * * *